United States Patent
Riekenberg et al.

(10) Patent No.: US 11,610,176 B2
(45) Date of Patent: Mar. 21, 2023

(54) SYSTEMS AND METHODS FOR PROVIDING AVAILABILITY OF INVENTORY HAVING HIGH INVENTORY VOLATILITY

(71) Applicant: Target Brands, Inc., Minneapolis, MN (US)

(72) Inventors: Aaron Riekenberg, Minneapolis, MN (US); Paul Conway, Minneapolis, MN (US); Blake Kellar, Minneapolis, MN (US)

(73) Assignee: Target Brands, Inc, Minneapolis, MN (US)

( * ) Notice: Subject to any disclaimer, the term of this patent is extended or adjusted under 35 U.S.C. 154(b) by 420 days.

(21) Appl. No.: 16/374,306

(22) Filed: Apr. 3, 2019

(65) Prior Publication Data

US 2020/0320466 A1 Oct. 8, 2020

(51) Int. Cl.
*G06Q 30/06* (2012.01)
*G06Q 30/00* (2012.01)
*G06F 17/30* (2006.01)
*G06Q 10/087* (2023.01)
*G06Q 30/0601* (2023.01)
*G06Q 30/0202* (2023.01)

(52) U.S. Cl.
CPC ....... *G06Q 10/087* (2013.01); *G06Q 30/0202* (2013.01); *G06Q 30/0639* (2013.01)

(58) Field of Classification Search
CPC ............. G06Q 10/087; G06Q 30/0202; G06Q 30/0639
See application file for complete search history.

(56) References Cited

U.S. PATENT DOCUMENTS

| 6,597,119 | B2 | 7/2003 | Ito | |
|---|---|---|---|---|
| 7,321,863 | B2 | 1/2008 | Hartmann | |
| 8,856,117 | B2 | 10/2014 | McCullough et al. | |
| 9,152,987 | B1 * | 10/2015 | Petrich | G06Q 30/0601 |
| 9,773,223 | B2 * | 9/2017 | Vasantham | G06Q 10/087 |
| 9,916,560 | B2 * | 3/2018 | Vasantham | G06Q 10/087 |
| 10,163,150 | B1 * | 12/2018 | Eby | G06Q 30/0639 |
| 2014/0025535 | A1 * | 1/2014 | Douglas | G06Q 10/063 |
| | | | | 705/26.8 |
| 2016/0180284 | A1 * | 6/2016 | Waldman | G06Q 30/0635 |
| | | | | 705/26.44 |
| 2016/0225045 | A1 * | 8/2016 | Cumberland | G06F 16/9537 |
| 2017/0068973 | A1 * | 3/2017 | Sinkel | G06Q 30/0201 |
| 2017/0147966 | A1 * | 5/2017 | Aversa | G06Q 10/087 |
| 2018/0012280 | A1 * | 1/2018 | Eshun | G06Q 30/0625 |

(Continued)

OTHER PUBLICATIONS

Yu Yao et al, May 1, 2016, 2016 IEEE Information Technology, Networking, Electronic and Automation Control Conference (pp. 321-326).*

(Continued)

*Primary Examiner* — Talia F Crawley
(74) *Attorney, Agent, or Firm* — Merchant & Gould P.C.

(57) ABSTRACT

Methods and systems for providing inventory availability information to a web server from a plurality of inventory servers and/or intermediate servers. Inventory availability information may be retrieved from different sources, depending on whether the item is considered a high-traffic item. A high-traffic item may be one, for example, that is extremely popular, of limited release, on sale, or has a limited inventory.

21 Claims, 8 Drawing Sheets

(56) References Cited

U.S. PATENT DOCUMENTS

2018/0364770 A1* 12/2018 Faith ................... G06Q 20/10
2019/0347606 A1* 11/2019 Malecha ............ G06Q 30/0223

OTHER PUBLICATIONS

U. Cetintemel et al.,Jan. 1, 2001,Proceedings 21st International Conference on Distributed Computing Systems (pp. 154-161).*
Velusamy, Gandhimathi et al,Jan. 1, 2018 ,Future internet, 10(7), 10.3390/fi10070057.*
Zhang, T.et al, Jan. 1, 1997,Proceedings of ICC'97—International Conference on Communications (vol. 2, pp. 580-584 vol. 2).*
G Teodoro et al, Load Balancing on stateful Clustered Webservers,2003.*
Gustavo M. C. Gama et al, Resource Placement in Distributed E Commerce Servers, 2001 IEEE pp. 1677-1682.*

* cited by examiner

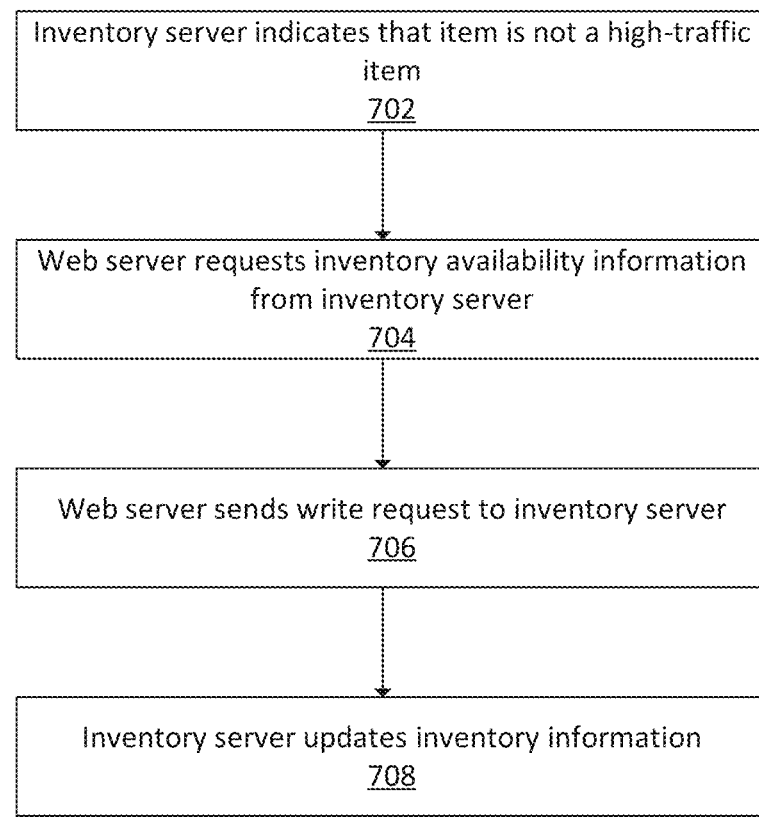
FIG. 7

SYSTEMS AND METHODS FOR PROVIDING AVAILABILITY OF INVENTORY HAVING HIGH INVENTORY VOLATILITY

TECHNICAL FIELD

The present disclosure relates generally to methods and systems for managing inventory availability information in a retail enterprise.

BACKGROUND

Inventory management systems are commonly maintained by merchants, especially merchants that offer items for sale online. Inventory management systems track current inventory levels for all inventory items the retailer offers for sale. Without accurate inventory levels, over-selling or under-selling problems occur.

Updating item inventory levels on a real-time basis is resource intensive and requires servers to constantly respond to read and write requests from web servers or other point-of-sale systems. In situations where an item is extremely popular, the servers maintaining inventory information can become overwhelmed, which may result in delayed response to such inventory requests, and therefore result in inventory tracking servers providing inaccurate (out of date) inventory information.

For at least these reasons, improvements to inventory management systems are desired.

SUMMARY

In general, a system for providing availability information for an inventory items provides more accurate inventory availability information. Aspects of the system include automatically determining when an item is a high-traffic item, and caching inventory availability information from an inventory server for retrieval from an intermediate server. Aspects further include accessing inventory availability from the intermediate server, and sending changes to inventory availability to the inventory server.

In an aspect, a system for providing near real-time inventory availability includes a plurality of inventory servers configured to track inventory for a collection of items offered by a retailer across each of a plurality of retail locations, each of the plurality of inventory servers being assigned a different subset of the collection of items and maintaining an inventory availability information for the assigned subset of the collection of items; a plurality of intermediate servers, each of the intermediate servers being configured to store the inventory availability information for one or more items within the collection of items, the one or more items being designated as high-traffic items; and a server configured to receive inventory read request for items included in the collection of items, each inventory read request being associated with an item and, in response to the inventory read request: determine whether the item is a high-traffic item; if the item is a high-traffic item, send the inventory read request to the intermediate server from among the plurality of intermediate servers; and if the item is not a high traffic item, send the inventory read request to the inventory server associated with the item.

In another aspect, a method for providing near real-time inventory availability includes: receiving, at a web server, an inventory read request for an item offered for sale by a retailer; determining, by an inventory server, whether the item is a high-traffic item; if the item is a high traffic item, sending the inventory read request to an intermediate server selected from among a plurality of intermediate servers; and if the item is not a high traffic item, sending the inventory read request to the inventory server associated with the item; and receiving, at the web server, an inventory availability information for the item, the inventory availability information received from the intermediate server or the inventory server.

In yet another aspect, a method for providing near real-time inventory information for high-traffic items includes: receiving, at a web server, an inventory read request for an item offered for sale by a retailer; determining, by an inventory server, that the item is a high-traffic item; sending inventory availability information, by the inventory server, to the intermediate server at a predetermined time interval; sending the inventory read request to an intermediate server selected from among a plurality of intermediate servers; receiving, at the web server, the inventory availability information for the item from the intermediate server; and sending, by the web server, a write request to the inventory server, the write request including a change of inventory.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 7 illustrates an example method of using the system in a non-high-traffic item mode.

DETAILED DESCRIPTION

Figure 1:
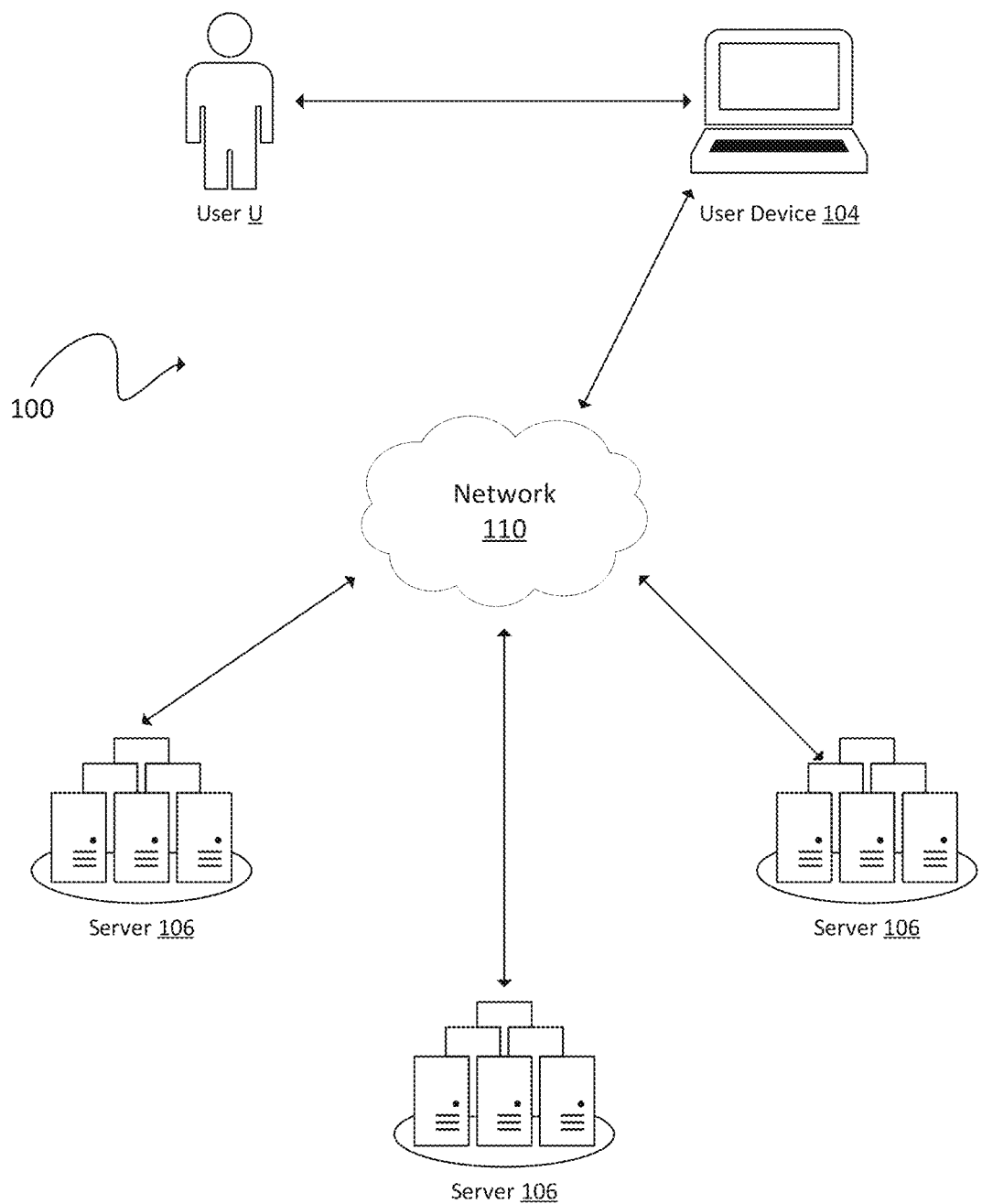
FIG. 1 illustrates a schematic diagram of an environment including an inventory management system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure describes systems and methods for providing inventory availability information to a web server. Such information can be provided, for example, to users browsing the web server for determining inventory availability, such as in the case of interaction with an online retailer or a mixed online and in-store retailer.

In the context of the present disclosure, inventory availability information may also be referred to herein as item inventory information. The inventory information may be retrieved from different sources, depending on whether the item is considered a high-traffic item. An item is a high-traffic item when the number of read requests and/or write requests sent to the inventory servers is above a threshold. The threshold may be a threshold determined by an enterprise to risk providing out-of-date inventory information to a web server, e.g., due to the web server being overwhelmed with inventory read requests. A high-traffic item may be one, for example, that is extremely popular, of limited release, on sale, or has a limited inventory.

When an item becomes a high-traffic item, it may become more efficient for the web server to request cached information stored at an intermediate server, rather than to request inventory availability information from the inventory server dedicated to tracking inventory for that particular item. In an example arrangement, there may be multiple intermediate servers useable with a set of inventory servers; while inventory servers are dedicated to managing inventory information for a particular item or subset of items associated with an enterprise or retailer, intermediate servers may manage inventory information for any of a flexible, selectable set of inventory items, and may be a subset of the inventory information available at the inventory server(s). Such intermediate servers receive inventory availability information from the inventory servers at a regular interval. The inventory availability information sent to the intermediate server may be limited, for example, only whether or not the item is available and where the item is located. Alternatively, the inventory information stored at the inventory server may include item information as well as inventory levels and where the item is located.

As noted above, to ensure a single source of truth for item inventory, in certain implementations, item information for an individual item is stored on a single inventory server. A single inventory server may maintain information for an item or multiple items, but information for a single item is not stored on multiple inventory servers. Furthermore, in many cases, a single inventory server may store inventory information for only a subset of the items offered by a retailer via the web server. When an item is a high-traffic item, the inventory availability information of a single item is stored, temporarily, on multiple intermediate servers. Item information includes at least inventory availability information. Such intermediate servers can provide that information in response to web server requests for inventory information, e.g., read requests of the inventory information.

In the event a user elects to purchase or acquire an item, such a change will be reflected as a write operation that is propagated to the inventory sever (e.g., either directly from a web server or relayed by the intermediate server in the case of an online transaction, or from a point of sale in the case of an in-store transaction). Such write operations are sent to the inventory server regardless of whether of where the initial read request was sent. Additionally, updated inventory information reflective of changes based on write operations are periodically propagated to intermediate servers to ensure that up-to-date inventory information is available from those intermediate servers.

When an item is no longer a high-traffic item, the web servers return to sending read requests to the inventory servers. The web servers may determine when the item is no longer a high-traffic item and communicates that to the inventory server. An item is no longer a high-traffic item when the read request rate drops below the threshold level. An item may also be no longer considered a high-traffic item by manually communicating that to the inventory server.

FIG. 1 illustrates an inventory availability system 100 for providing inventory availability information to users. The system includes a user device 104, communicatively connected to a plurality of servers 106a, 106b, 106c via a network 110 (e.g., the Internet).

An inventory availability system 100 is used to accurately provide inventory levels to users of a retailer. A user may be a customer shopping online via a retailer website, or a user may be an employee with a mobile point-of-sale device within a retail location. An example shopping experience includes having a user U shop online at a retailer website and select to view item information for an item offered for sale. Once the user has selected the item, the web server sends a read request via the network 110 for inventory availability information from the servers 106. The servers 106 respond with an availability of the item. After a user U has completed a purchase of the item, the web server sends a write response to the server 106 to change the inventory level.

Inventory information can be stored on a single server 106, or multiple servers 106. For example, if the server is an inventory server, then the item information is stored on a single server. If the server is an intermediate server, then the inventory availability information is stored on a plurality of servers.

The network 110 allows for communication between one or more computing devices in the system 100. The network 110 can be a wired network or a wireless network such as the Internet.

A user device 104 may be a mobile device that has access to the retailer's website. Alternatively, a user device 104 may be a point-of-sale system used by an employee, such as a mobile POS system.

Figure 2:
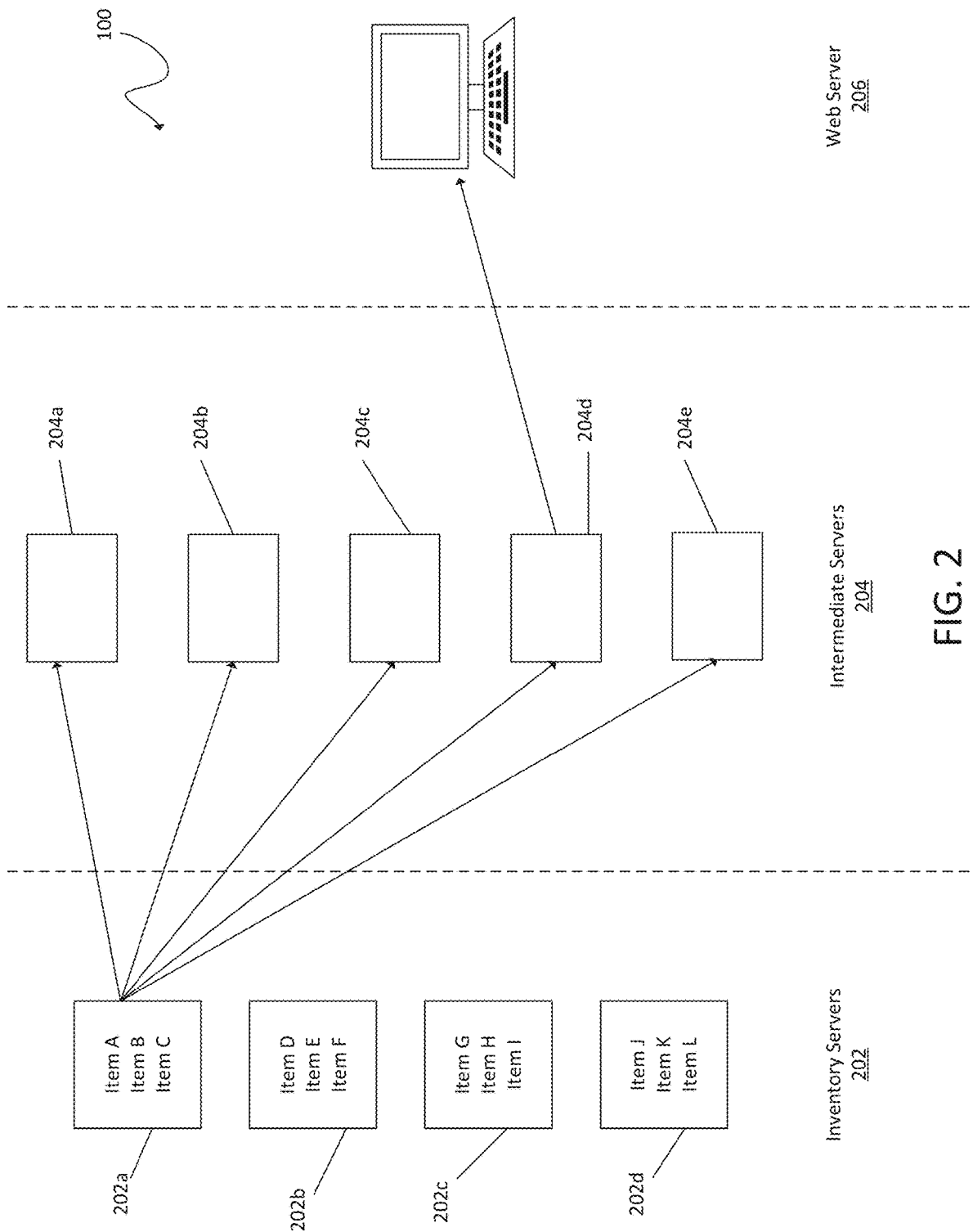
FIG. 2 illustrates a detailed block diagram of the system of FIG. 1.

FIG. 2 illustrates a more detailed schematic diagram of the system 100, including the servers 106 of FIG. 1. The schematic is simplified to illustrate how inventory servers 202 interact with intermediate servers 204 and web server 206, according to an example embodiment.

The inventory servers 202 include a plurality of servers, in the embodiment shown. Each inventory server 202a, 202b, 202c, 202d is configured to track inventory for a collection of items offered by a retailer across a plurality of retail locations. Each inventory server is assigned a different subset of the collection of items and maintaining an inventory availability information for the assigned subset of the collection of items.

For example, a first inventory server 202a contains inventory availability information for item A, item B, and item C; while server 202b contains inventory availability information for item D, item E, and item F.

The intermediate servers 204 comprise a plurality of servers, each intermediate server 204a, 204b, 204c, 204d, 204e is configured to store the inventory availability information for one or more items within the collection of items, when the item is designated as a high-traffic item. The same inventory invention is sent from the individual inventory server 202a to all intermediate servers 204. For example, inventory server 202a sends inventory availability information to all the intermediate servers 204, where is it stored for the web server 206 to retrieve. The intermediate servers 204 may be servers managed by the retailer, or cloud-based servers configured to respond to inventory read requests for load balancing of read request handling; in some embodiments, a mix of types of intermediate servers 204 may be used.

While the connection between a single inventory server 202 and multiple intermediate servers 204 is shown, intermediate servers 204 can be communicatively connected to multiple inventory servers 202. The web server 206 can communicate with any of the intermediate servers 204, with intermediate servers being assigned to respond to requests from the web server on a round-robin, load-balanced, or by region from which the web server request originated. Other assignment schemes for the intermediate servers 204 may be used as well.

Figure 3:
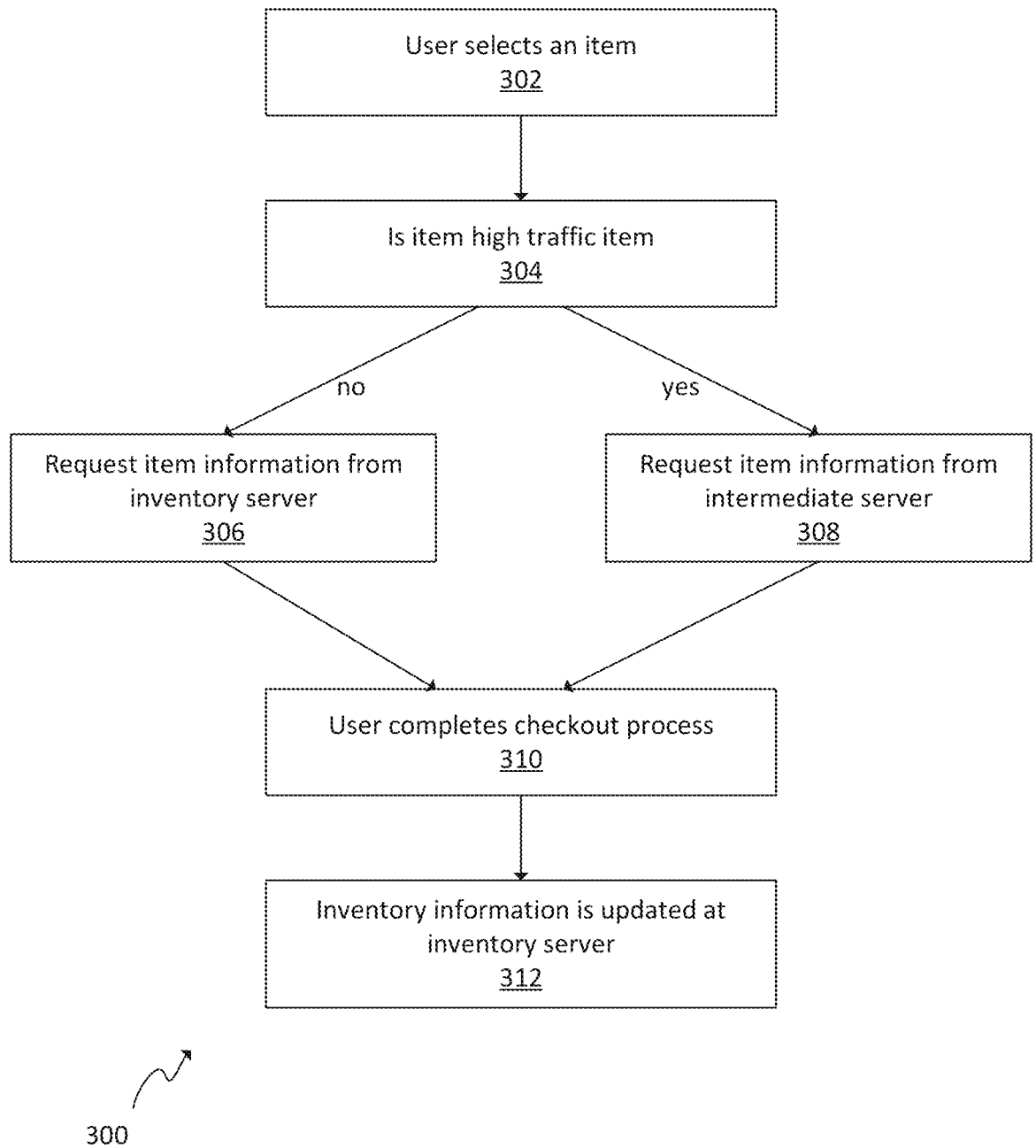
FIG. 3 illustrates an example method of using the inventory management system of FIG. 2.

FIG. 3 illustrates a general flowchart of a method 300 for using an item availability system, according to an example embodiment. The method can be performed, for example, by a plurality of servers, such as at least one inventory server 202, at least one intermediate server 204, and at least one web server 206.

At 302, a user selects an item from a plurality of items for sale on retailer website. Selecting an item may be a customer digitally selecting an item on a webpage to view more information related to the item. For example, this may take the customer to webpage or popup webpage that includes additional item information. The item information page may include, at least, the inventory of the item and/or where the inventory is located. Alternatively, selecting an item may include a customer digitally selecting the item and placing the item into a digital cart. The webpage including the digital cart may include displaying the inventory of the item and/or where the inventory is located. In either situation, the web server must receive the inventory information to provide an accurate inventory level. Providing an accurate inventory level also ensures that the retailer website only offers for sale items that the retailer has in stock.

At 304, it is determined whether the item selected is a high-traffic item. In an embodiment, the inventory server determines when an item becomes a high-traffic item. An item is a high traffic-item when read requests from the web server are received at the inventory servers at a rate higher than a predetermined threshold. The predetermined threshold may be a rate greater than once every two seconds, greater than once every second, or greater than 10 times per second. The predetermined threshold is a rate at which the inventory servers cannot respond accurately to read requests. In some instances, the predetermined threshold is set by the retailer/enterprise based on observations regarding occurrences or frequency of over-selling or under-selling due to inaccurate inventory information being provided to the web server.

If the item is determined not to be a high-traffic item, then at 306, the item information is requested from the inventory server. The web server sends a read request to the inventory server to receive item information, including, at least inventory availability information. The read request is sent to a single inventory server that stores all the information for an individual item. While a single inventory server may store information for more than one item, the information for an item is only stored on a single inventory server.

If the item is determined to be a high-traffic item, then at 308, the inventory availability information is requested from the intermediate server. The intermediate server stores cached inventory availability information retrieved from the inventory server. The intermediate server stores inventory availability information for all high-traffic items and every intermediate server stores inventory availability information for the high-traffic items. When an item is deemed a high-traffic item, the intermediate servers fetch inventory availability information from the inventory servers at predetermined intervals. A predetermined interval is a time frequent enough that the web servers provide accurate and near-real time inventory information, but not more frequent than the predetermined threshold rate. For example, a predetermined interval may be every 1 second, every 2 seconds, or every 3 seconds.

In example embodiments, a web server will be notified of which items are considered high traffic items by the inventory server and the intermediate server. In such embodiments, the web server will, by default, access all inventory information from the inventory server, but will, for such high traffic items, utilize an intermediate server instead. In alternative embodiments, the web server will be notified of the status of all items as either high traffic items or not high traffic items, and will issue requests accordingly. In a still further embodiment, the web server will pass all inventory requests via the intermediate server, which will respond directly for high traffic items and will relay such requests to the relevant inventory server for non-high traffic items.

At 310, a user completes the checkout process. When a user purchases the item, the inventory of that item changes. Then, at 312 the inventory information is updated at the inventory server. After the checkout is complete, the web server sends a write request back to the inventory server, so the inventory server can update the inventory information. Regardless of whether the item is a high-traffic item or not, the web server sends the write request to the inventory server.

It is noted that in some network arrangements, not only will high-traffic items be cached in some intermediate servers, but other items that are not high-traffic items may be cached. This may be the case where the intermediate server is implemented as a cloud server useable to service a specific instance of the web server (e.g., for a particular region or version of the website provided by the retailer by that web server). In such cases, the cloud server will operate in an analogous manner to the intermediate server, by receiving updates regarding inventory availability from one or all inventory servers, and by responding to inventory availability read requests for any such item cached, while passing write operations (e.g., in the event of a purchase) back to the relevant inventory server. However, in most cases, intermediate servers will not separately cache inventory availability information, since inventory servers are capable of managing a typical load of read and write requests regarding the inventory availability information.

Figure 4:
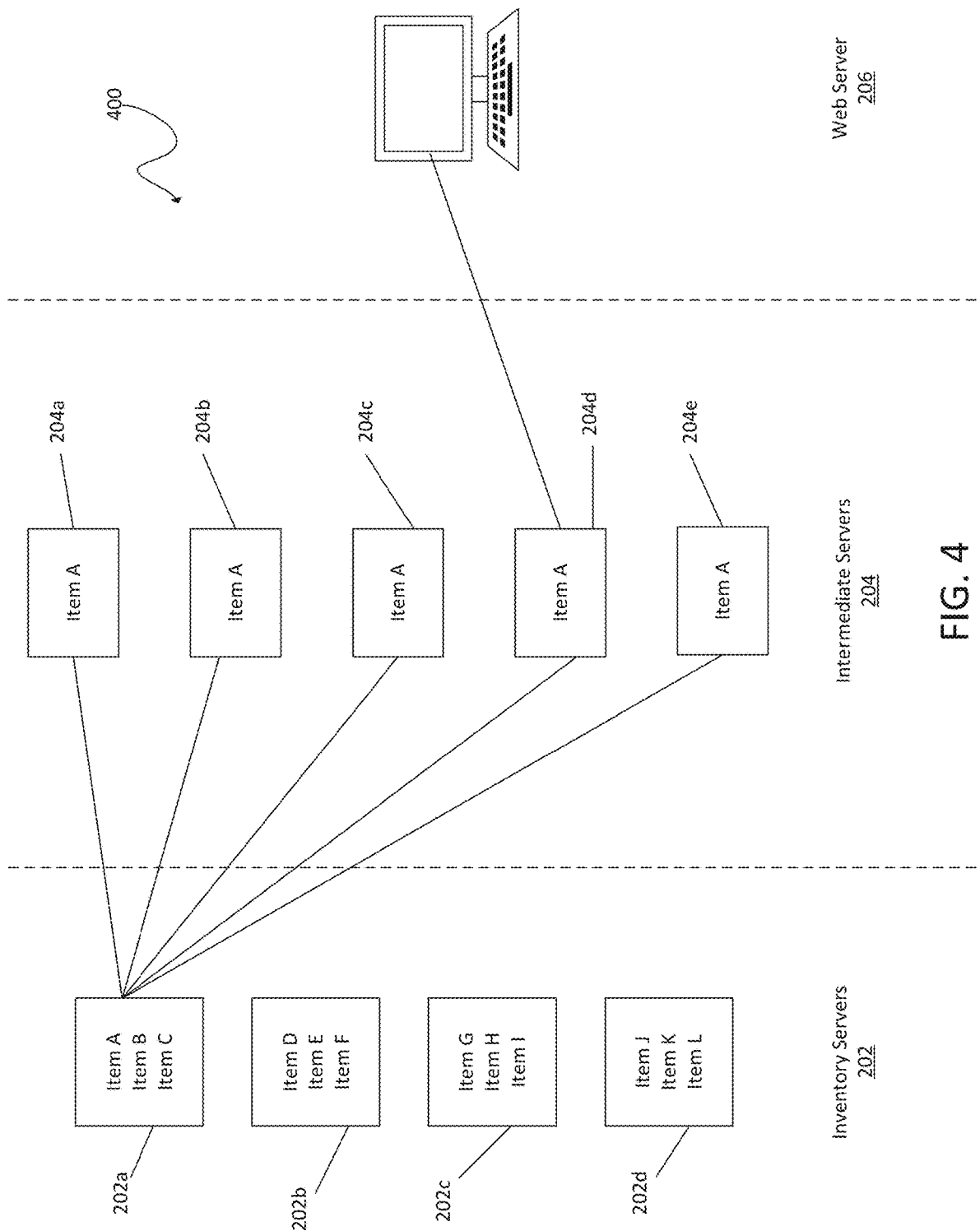
FIG. 4 illustrates a detailed block diagram of the system in a high-traffic item mode.

FIG. 4 illustrates an example environment 400 of a plurality of servers maintaining information for a high-traffic item. The example environment 400 illustrates operation of the method 500 within an example environment, such as is seen in FIG. 2. As shown, item A is indicated as a high-traffic item. In this example, the inventory servers 202 have received read requests from the web server 206 at a rate higher than a predetermined threshold for item A.

In response to the read request rate being higher than the threshold, the inventory availability information is sent from the inventory server 202 to all the intermediate servers 204 at a predetermined interval. Every intermediate server 204*a*, 204*b*, 204*c*, 204*d*, 204*e* stores inventory availability information of item A, received from a single inventory server 202. The web server 206 can send a read request for inventory availability information of item A to any intermediate server 204; in some examples, the web server 206 may select an intermediate server based on a geographical location from which a request is received, based on a load-balancing algorithm, or other arrangement.

When a web server 206 sends a read request to an intermediate server 204, the web server 206 may only receive a portion of the item information. The portion of the item information includes inventory availability information and can also include location information. In another embodiment, the web server 206 may receive all item information, including, for example, inventory availability information, location information, product description information, and other similar information.

Use of the intermediate servers 204 occurs when an item becomes a high-traffic item. For example, item X may be a really popular item that goes on sale at a specific time. Once item X goes on sale, multiple customers begin trying to purchase the item on a retailer website. Initially, the web servers 206 that host the retailer website send read requests to the inventory server 202. However, at some point the inventory server 202 receives too many read request and cannot continue to provide accurate inventory availability information.

When the inventory server 202 can no longer handle the read requests, the inventory server 202 begins to send inventory availability information to intermediate servers 204. The intermediate servers 204 cache the information sent from the inventory server 202 and provide that information to the web servers 206. The information provided by the intermediate servers 204 does not include all item information, but includes at least whether the item is available or not.

At this time, the item is labeled a high-traffic item and the web servers 206 request item information from the intermediate servers 204 instead. The web servers 206 continue to request item information from the intermediate servers 204 until the web server 206 determines that the item is not a high-traffic item anymore. At that time, the web server 206 request item information from the inventory server 202 again, and the inventory server 202 stops sending information to the intermediate servers 204.

The intermediate servers 204 only cache inventory availability information for high-traffic items. If there are no high-traffic items, the intermediate servers 204 may be not used.

Figure 5:
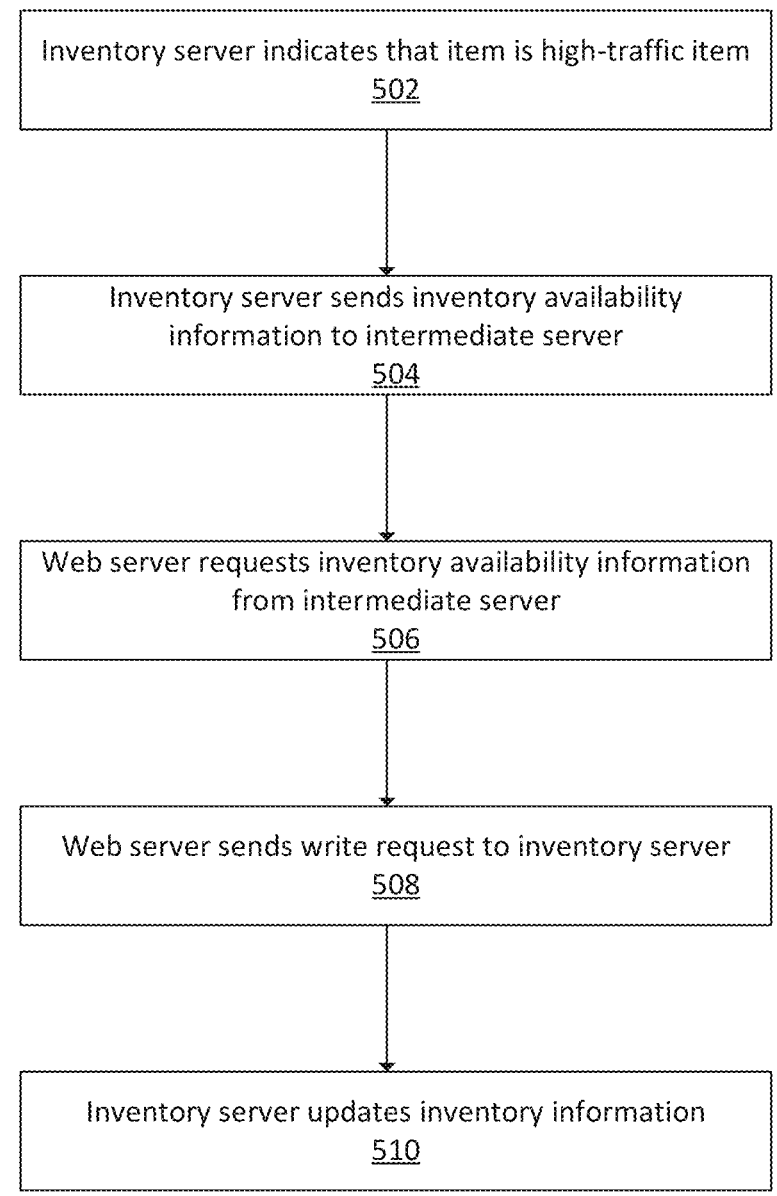
FIG. 5 illustrates an example method of using the system in a high-traffic item mode.

FIG. 5 illustrates a general flowchart of a method 500 for using an item availability system when the item is a high-traffic item, according to an example embodiment.

At 502, the inventory server indicates that the item is a high-traffic item. An item is a high traffic-item when read requests received from the web server come at a rate higher than a predetermined threshold rate. The predetermined threshold may be a rate greater than once every two seconds, greater than once every second, or greater than 10 times per second. The threshold rate is a rate at which the inventory servers cannot keep up with demand from the web servers. When the read request rate is higher than the threshold rate, the inventory servers may provide inaccurate inventory information to the web servers.

An item may also be classified as a high-traffic item if the write requests are higher than a predetermined threshold, or if a combination of read and write requests reaches a predetermined threshold. The predetermined threshold may be a rate greater than once every two seconds, greater than once every second, or greater than 10 times per second.

In a further embodiment, if a second predetermined threshold rate is met, all read requests and write requests are denied. The second predetermined threshold rate is a rate at which the inventory server cannot keep up with write requests received. Denying read requests and write requests allows the inventory server to satisfy outstanding requests for other items. Once outstanding requests are satisfied, the inventory server returns to a high-traffic mode for items that are high-traffic items.

At 504, the inventory server sends inventory availability information to the intermediate server. The information sent includes at least inventory availability information. Additionally information, such as location information, may also be sent to the intermediate servers. Inventory availability information is sent to the intermediate servers at a regular interval. The interval is a rate less than the threshold level, but great enough that the cached information stored at the intermediate servers is accurate. The inventory availability information is sent to the intermediate servers until the item is no longer a high-traffic item.

At 506, the web server requests inventory availability information from the intermediate server. The intermediate servers store cached inventory availability information received from the inventory server, which is near real-time inventory information.

At 508, the web server sends a write request to the inventory server. When the inventory of the item has changed, for example, when a customer purchases the item, the web server sends that information to the inventory server so the inventory server can update the inventory information. Regardless of where the read request for inventory information was sent, a write request is always sent to the inventory server.

At 510, the inventory server updates the inventory information based upon the write request from the web server.

Figure 6:
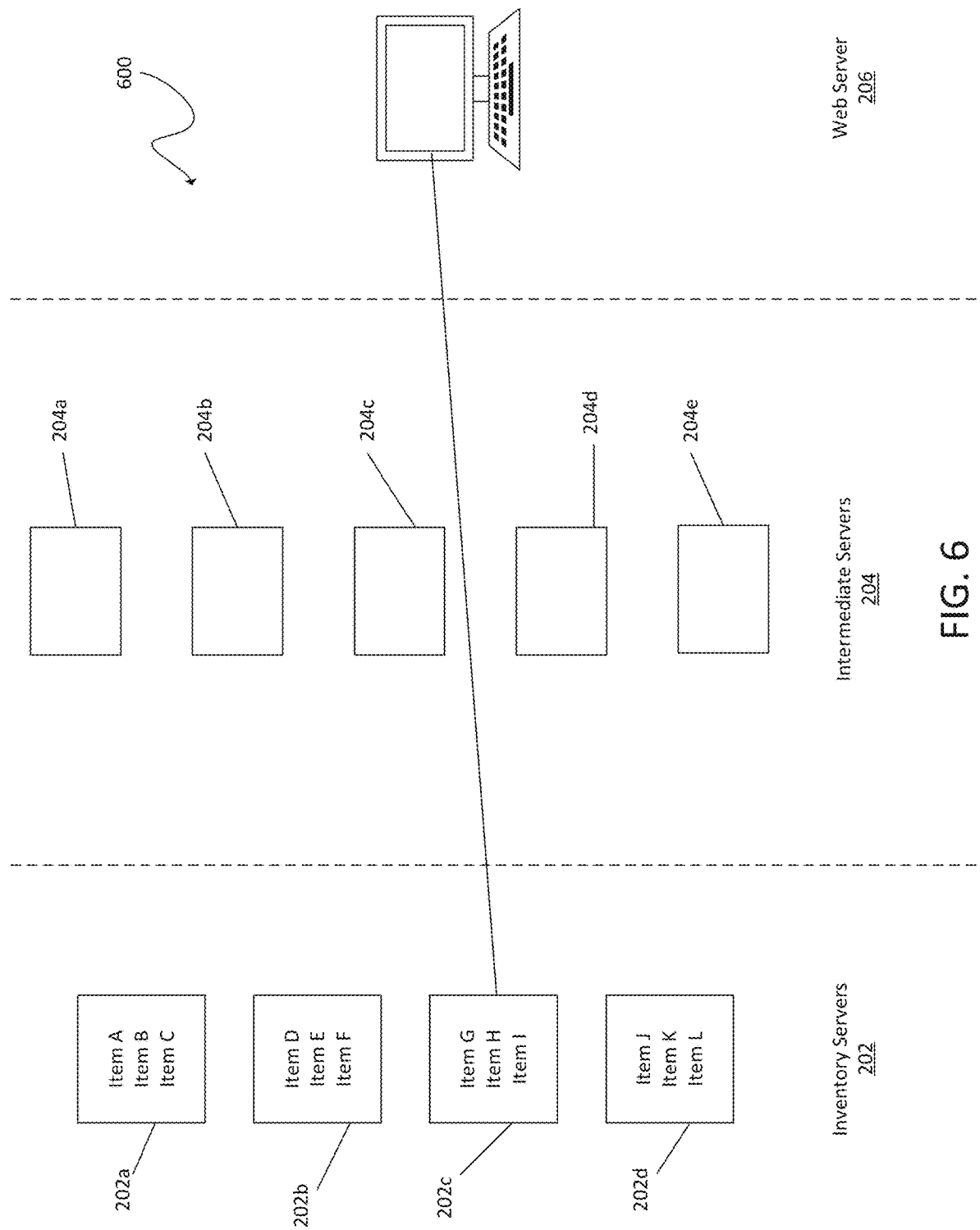
FIG. 6 illustrates a detailed block diagram of the system in a non-high-traffic item mode.

FIG. 6 illustrates an example environment 600 of a plurality of servers maintaining information for an item that is not a high-traffic item. The example environment 600 illustrates operation of the method 500 within an example environment, such as is seen in FIG. 2.

In an example, the inventory servers 202c receive read requests directly from the web server 206. Inventory availability information is sent from the inventory server 202c directly to the web server 206. As shown, the web server 206 requests information about Item G, and sends the read request to the appropriate inventory server 202c, which then sends the correct inventory information back to the web server 206.

FIG. 7 illustrates a general flowchart of a method 700 for using an item availability system when the item is not a high-traffic item, according to an example embodiment.

At 702, the inventory server indicates that the item is not a high-traffic item. An item is not a high-traffic item when read requests received form the web server come at a rate lower than a predetermined threshold rate. The predetermined threshold rate is described in detail above. When the read request rate is lower than the threshold level, the inventory servers can provide accurate inventory information to the web servers.

At 704, the web server requests inventory availability information from the inventory server. When the inventory server receives a read request, it processes the request and provides inventory information to the web server.

At 706, the web server sends a write request to the inventory server. When the inventory of the item has changed, for example, when a customer purchases the item, the web server sends that information to the inventory server so the inventory server can update the inventory information.

At 708, the inventory server updates the inventory information. The inventory is updated based upon the information contains in the write request sent from the web server.

Figure 8:
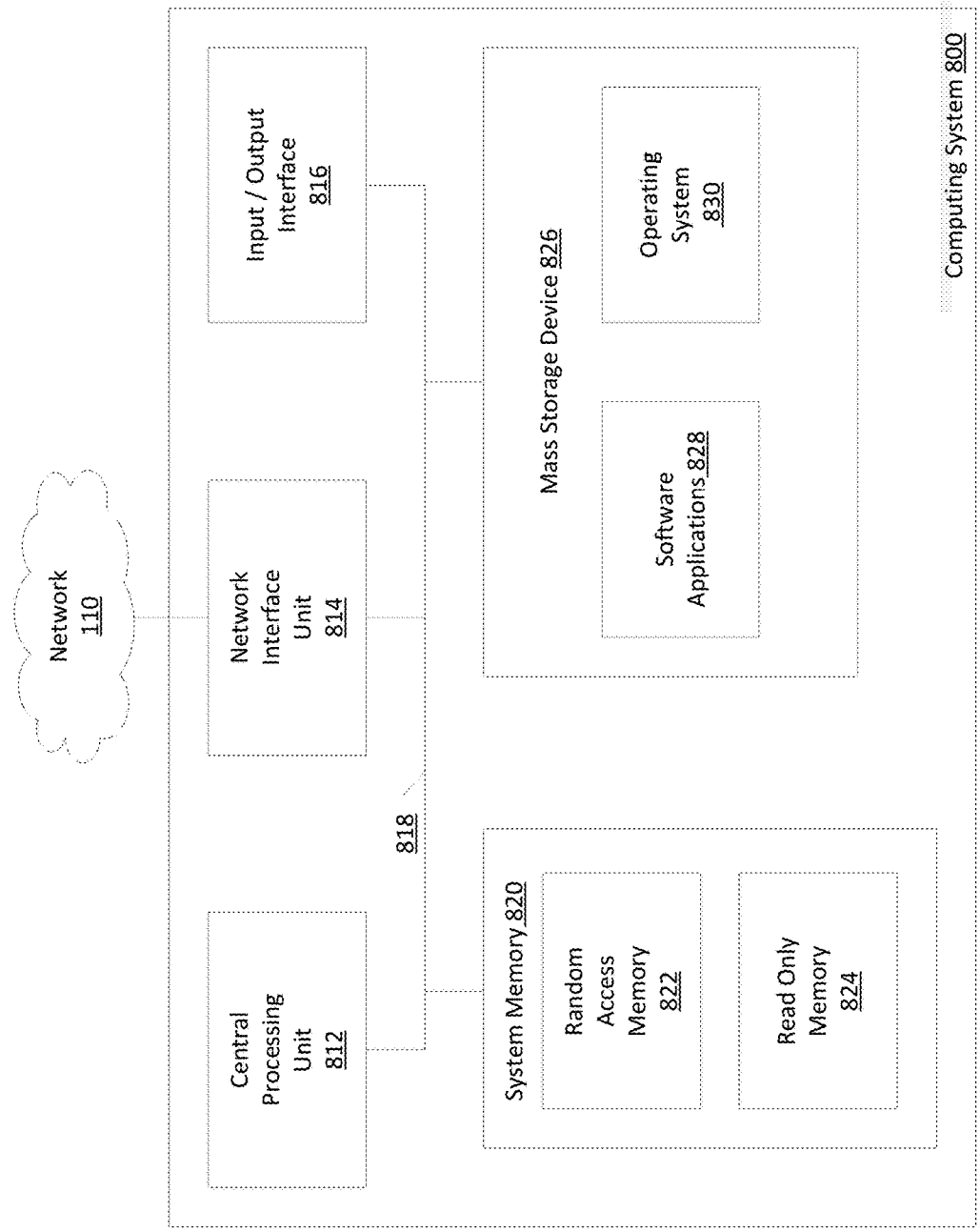
FIG. 8 displays a schematic diagram of an example computing device usable in the system of FIG. 1.

Referring now to FIG. 8, an example block diagram of a computing system 800 is shown that is useable to implement aspects of the inventory availability system 100 of FIG. 1. In the embodiment shown, the computing system 800 includes at least one central processing unit ("CPU") 812, a system memory 820, and a system bus 818 that couples the system memory 820 to the CPU 812. The system memory 820 includes a random access memory ("RAM") 822 and a read-only memory ("ROM") 824. A basic input/output system that contains the basic routines that help to transfer information between elements within the computing system 800, such as during startup, is stored in the ROM 824. The computing system 800 further includes a mass storage device 826. The mass storage device 826 is able to store software instructions and data.

The mass storage device 826 is connected to the CPU 812 through a mass storage controller (not shown) connected to the system bus 818. The mass storage device 826 and its associated computer-readable storage media provide nonvolatile, non-transitory data storage for the computing system 800. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 812 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 800.

According to various embodiments of the invention, the computing system 800 may operate in a networked environment using logical connections to remote network devices through a network 110, such as a wireless network, the Internet, or another type of network. The computing system 800 may connect to the network 110 through a network interface unit 814 connected to the system bus 818. It should be appreciated that the network interface unit 814 may also be utilized to connect to other types of networks and remote computing systems. The computing system 800 also includes an input/output unit 816 for receiving and processing input from a number of other devices, including a touch user interface display screen, or another type of input device. Similarly, the input/output unit 816 may provide output to a touch user interface display screen or other type of output device.

As mentioned briefly above, the mass storage device 826 and the RAM 822 of the computing system 800 can store software instructions and data. The software instructions include an operating system 830 suitable for controlling the operation of the computing system 800. The mass storage device 826 and/or the RAM 822 also store software instructions, that when executed by the CPU 812, cause the computing system 800 to provide the functionality discussed in this document. For example, the mass storage device 826 and/or the RAM 822 can store software instructions that, when executed by the CPU 812, cause the computing system 800 to receive and analyze inventory and demand data.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A system for providing near real-time inventory availability, the system comprising:
    a plurality of inventory servers configured to track inventory for a collection of items offered by a retailer across each of a plurality of retail locations, each of the plurality of inventory servers being assigned a different subset of the collection of items and maintaining an inventory availability information for the assigned subset of the collection of items, and to designate high-traffic items in the assigned subset of the collection of items for each item for which the inventory server receives associated inventory read requests at a rate higher than a threshold;
    a plurality of intermediate servers, each of the plurality of intermediate servers being configured to store the inventory availability information for one or more items within the collection of items, the one or more items being the designated high-traffic items and the inventory availability information for the one or more items being retrieved periodically from one or more of the plurality of inventory servers; and
    a web server configured to:
        receive inventory read requests for items included in the collection of items, each inventory read request being for inventory availability information associated with an item from the collection of items;
        determine, for each received inventory read request, whether the received inventory read request is for one of the high-traffic items;
        for at least one received inventory read request associated with an item designated as one of the high-traffic items, send the at least one received inventory read request to an intermediate server from among the plurality of intermediate servers rather than the at least one received inventory read request being handled at the inventory server to which the item designated as one of the high-traffic items is assigned; and
        for at least one other received inventory read request associated with an item not designated as one of the high-traffic items, send the at least one other received inventory read request to be handled at the inventory server to which the item not designated as one of the high-traffic items is assigned.

2. The system of claim 1, wherein, for the at least one of the items indicated as being one of the high-traffic items, the web server is configured to receive a response from the intermediate server, and for the at least one other of the items indicated as not being one of the high-traffic items, the web server is configured to receive a response from the inventory server to which the at least one other item is assigned.

3. The system of claim 1, wherein in response to an item, from the items, being purchased, the web server is configured to send write requests to the inventory server to which the item is assigned to for updating the inventory availability information for the item.

4. The system of claim 1, wherein the inventory server is configured to provide an indication to the plurality of intermediate servers and the web server that each item is one of the high-traffic items or is not one of the high-traffic items.

5. The system of claim 1, wherein the inventory availability information includes location information.

6. The system of claim 1, wherein for the at least one of the items indicated as being one of the high-traffic items, at least one of the plurality of intermediate servers is configured to request the inventory availability information from the inventory server to which the at least one of the items is assigned at a predetermined time interval.

7. The system of claim 6, wherein the predetermined time interval is every two seconds.

8. The system of claim 1, wherein the plurality of intermediate servers store inventory availability information for less than all items offered by the retailer.

9. The system of claim 1, wherein the plurality of intermediate servers store inventory availability information for all items that are the high-traffic items.

10. The system of claim 1, wherein the web server is configured to remove an item from the items indicated as the high-traffic items when inventory read requests for the item are received at a rate below the threshold.

11. A method for providing near real-time inventory availability, the method comprising:
   receiving, at a web server, indicators for high-traffic items and inventory read requests for at least two items offered for sale by a retailer;
   determining whether each of the at least two items is indicated as being one of the high-traffic items, wherein each item of the at least two items is designated as one of the high-traffic items when inventory read requests being for inventory availability information associated with the item are received by an inventory server to which the item is assigned at rate higher than a threshold;
   for a first item of the at least two items indicated as being one of the high-traffic items, sending the respective inventory read request for the first item to an intermediate server selected from among a plurality of intermediate servers rather than the respective inventory read request being handled at the inventory server to which the first item is assigned;
   for a second item of the at least two items indicated as not being one of the high-traffic items, sending the respective inventory read request for the second item to an inventory server to which the second item is assigned; and
   receiving, at the web server, inventory availability information for the at least two items, the inventory availability information for the first item received from the intermediate server and the inventory availability information for the second item received from the inventory server to which the second item is assigned,
   wherein the intermediate server retrieves the inventory availability information for the first item periodically from the inventory server to which the first item is assigned.

12. The method of claim 11, wherein for the first item, the web server receives a response from the intermediate server, and for the second item, the web server receives a response from the inventory server to which the second item is assigned.

13. The method of claim 11, wherein for the first item, the intermediate server requests inventory availability information from an inventory server to which the first item is assigned at a predetermined time interval.

14. The method of claim 13, wherein the predetermined time interval is every two seconds.

15. The method of claim 13, wherein, when inventory read requests for the first item are received by the web server at a rate lower than the threshold, the web server determines that the first item indicated as being one of the high-traffic items is no longer one of high-traffic items and indicates to the inventory server to which the first item is assigned to stop sending inventory availability information to the plurality of intermediate servers.

16. The method of claim 11, wherein in response to a purchase of an item, the web server sends a write request to an inventory server to which the item is assigned, the write request including a change of inventory associated with the item purchased.

17. The method of claim 11, wherein the inventory availability information for the at least two items includes providing where each of the at least two items is located.

18. A method for providing near real-time inventory availability, the method comprising:
   receiving, at a web server, indicators for high-traffic items and inventory read requests for a first item and a second item offered for sale by a retailer;
   determining that the first item is indicated as being one of the high-traffic items and the second item is indicated as not being one of the high-traffic items, wherein the first item is designated as one of the high-traffic items when inventory read requests being for inventory availability information associated with the first item are received by an inventory server to which the first item is assigned at a rate higher than a threshold;
   in response to determining that the first item is indicated as being one of the high-traffic items:
      sending the inventory read request for the first item to an intermediate server selected from among a plurality of intermediate servers rather than the inventory read request being handled at the inventory server to which the first item is assigned, wherein the plurality of intermediate servers receive, from an inventory server to which the first item is assigned, inventory availability information for the first item at a predetermined time interval; and
      receiving the inventory availability information for the first item from the intermediate server;
   in response to determining that the second item is indicated as not being one of the high-traffic items:
      sending the inventory read request for the second item to an inventory server to which the second item is assigned; and
      receiving the inventory availability information for the second item from the inventory server to which the second item is assigned; and
   in response to one or more of the first item and the second item being purchased, sending, by the web server, a write request to the respective inventory server to which the first item and the second item are assigned, the write request including a change of inventory associated with the one or more of the first item and the second item purchased.

19. The method of claim 18, wherein, when inventory read requests for the first item are received by the web server at a rate lower than the threshold, the web server determines that the first item is no longer one of the high-traffic items, and indicates to the inventory server to stop sending the inventory availability information for the first item to the plurality of intermediate servers.

20. The system of claim 1, wherein the threshold represents a rate at which at least one of the plurality of inventory servers cannot respond accurately to inventory read requests.

21. The system of claim 1, wherein for an item indicated as being one of the high-traffic items the webserver is configured to send inventory write requests to the inventory server to which the item is assigned and to send inventory read requests to one of the plurality of intermediate servers.

* * * * *